United States Patent
Martin et al.

(10) Patent No.: US 7,287,131 B1
(45) Date of Patent: Oct. 23, 2007

(54) METHOD AND APPARATUS FOR IMPLEMENTING A FULLY DYNAMIC LOCK-FREE HASH TABLE

(75) Inventors: Paul A. Martin, Arlington, MA (US); Victor Luchangco, Arlington, MA (US); Jan-Willem Maessen, Somerville, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 476 days.

(21) Appl. No.: 10/674,942

(22) Filed: Sep. 29, 2003

Related U.S. Application Data

(60) Provisional application No. 60/456,786, filed on Mar. 21, 2003.

(51) Int. Cl.
*G06F 17/30* (2006.01)
(52) U.S. Cl. .................. 711/154; 707/101; 707/103
(58) Field of Classification Search ................ 711/154; 707/101, 103
See application file for complete search history.

(56) References Cited

U.S. PATENT DOCUMENTS

| | | | | |
|---|---|---|---|---|
| 5,671,446 | A * | 9/1997 | Rakity et al. .................. | 710/54 |
| 5,960,434 | A * | 9/1999 | Schimmel .................... | 707/100 |
| 6,067,547 | A * | 5/2000 | Douceur .................... | 707/100 |
| 6,654,773 | B2 * | 11/2003 | Hills .......................... | 707/206 |
| 2001/0042204 | A1 * | 11/2001 | Blaker et al. ............... | 713/165 |
| 2004/0107227 | A1 * | 6/2004 | Michael ....................... | 707/206 |

OTHER PUBLICATIONS

Maged, Michael M., "High Performance Dynamic Lock-Free Hash Tables and List-Based Sets," Aug. 2002, ACM Press.*
Shalev, Ori and Nir Shavit, "Split-Ordered Lists: Lock-Free Extensible Hash Tables," Jul. 13-16, 2003, ACM Press.*
Harris, Timothy L., "A Pragmatic Implementation of Non-Blocking Linked-Lists," Oct. 2001, Proceedings of the 15th International Symposium on Distributed Computing.*
Publication entitled "Current Set Manipulation Without Locking", by Vladimir Lanin et al., 7th ACM Symposium on the Principles of Database Systems, pp. 211-220, Mar. 1988.
Publication entitled "DCAS-Based Concurrent Deques", by Ole Agesen et al., 12th Annual ACM Symposium on Parallel Algorithms and Architectures, Jul. 2000.
Publication entitled "Dynamic Lock-Free Deques Using Single-Address Double-Word CAS", by Maged M. Michael, Annual ACM Symposium on Principles of Distributed Computing Proceedings of the twenty-first annual Symposium on Principles of distributed computing, session 1, pp. 24-30, 2002, ISBN:1-58113-485.1.

(Continued)

*Primary Examiner*—Donald Sparks
*Assistant Examiner*—Jared I Rutz
(74) *Attorney, Agent, or Firm*—Park, Vaughan & Fleming LLP

(57) ABSTRACT

One embodiment of the present invention provides a system that implements a hash table that is fully dynamic and lock-free. During a lookup in the hash table the system first uses a hash key to lookup a bucket pointer in a bucket array. Next, the system follows the bucket pointer to a data node within a linked list that contains all of the data nodes in the hash table, wherein the linked list contains only data nodes and at most a constant number of dummy nodes. The system then searches from the data node through the linked list to locate a node that matches the hash key, if one exists.

36 Claims, 10 Drawing Sheets

OTHER PUBLICATIONS

Publication entitled "A Lock-Free Mechanism for Supporting Dynamic-Sized Data Structures", Maurice Herlihy et al., Proceedings of the Twenty-Second Annual ACM SIGACT-SIGOPS Symposium on Principles of Distributed Computing (PODC), Jul. 2003.

Publication entitled "Trie Hashing With Controlled Load", by Witold A. Litwin et al., IEEE Transactions on Software Engineering, vol. 17, No. 7, Jul. 1991.

Publication entitled "Split-Ordered Lists—Lock-free Resizable Hash Tables", by Ori Shalev et al., Proceedings of the Twenty-Second ACM Symposium on Principles of Distributed Computing, pp. 102-111, Jul. 13-16, 2003, Boston Massachusetts.

Publication entitled "The Repeat Offender Problem: A Lock-Free Mechanism for Supporting Dynamic-Sized Data Structures", by Maurice Herlihy et al., SUN Microsystems, Inc., Report TR-2002, 112, Jul. 2002.

Publication entitled "A Pragmatic Implementation of Non-Blocking Linked-Lists", by Timothy L. Harris, Proceedings of the 15th International Symposium on Distributed Computing, Oct. 2001, pp. 300-314.

Publication entitled "Non-Blocking Algorithms and Preemption-Safe Locking on Multiprogrammed Shared Memory Multiprocessors", by Maged M. Michael, Journal of Parallel and Distributed Computing 51(1), pp. 1-26, 1998..

Publication entitled "Non-Blocking K-Compare-Single-Swap" by Victor Luchangco et al., Sun Microsystems Laboratories 1 Network Drive Burlington, MA 01803, USA research.sun.com/projects/scalable/ Papers/p004-luchangco.pdf.

Publication entitled "Concurrent Maintenance of Skip Lists", by William Pugh Department of Computer Science, University of Maryland, CS-TR-2222.1, Jun. 1990..

Publication entitled "Skiplist-Based Concurrent Priority Queues", By I. Lotan Annual ACM Symposium on Principles of Distributed Computing, pp. 113-122, Atlanta, GA, May 1999.

Publication entitled "Non-Blocking Timeout in Scalable Queue-Based Spin Locks", by Michael L. Scott, F Department of Computer Science, University of Rochester, Feb. 2002.

Publication entitled "Trie Hashing", by Witold Litwin, 1981 ACM 0-89791-090-0, pp. 19-29.

Publication entitled "Linear Hashing: A New Tool for File and Table Addressing", by Withold A. Litwin, Proceedings of the Sixth Conference on Very Large Data Bases, 1980, pp. 212-223. http://www.ccom.unh.edu/vislab/cs515/Linear%20 Hashing.htm.

Publication entitled "Lock-Free Linked Lists Using Compare-and-Swap", by John D. Valois, Symposium on Principles of Distributed Computing 1995, pp. 214-222..

Publication entitled "Using Local-Spin k-Exclusion Algorithms to Improve Wait-Free Object Implementations", by James H. Anderson et al., Distributed Computing, 11(1):1-20, Sep. 1997.

Publication entitled "Practical Implementations of Non-Blocking Synchronization Primitives" by Mark Moir, Proceedings of the 15th Annual ACM Symposium on the Principles of Distributed Computing, Aug. 1997.

* cited by examiner

Shalev-Shavit
(PRIOR ART)

(with proportional indexing)

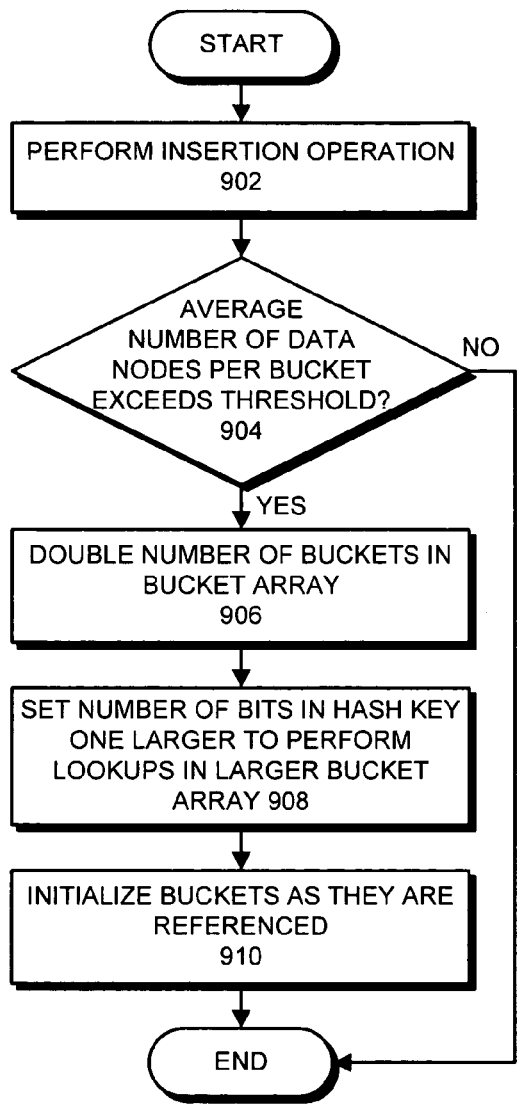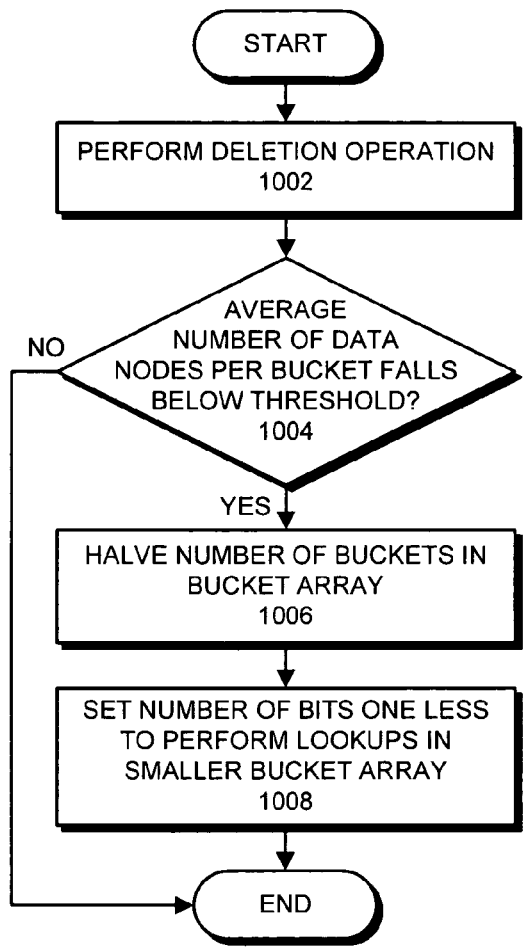
FIG. 9
FIG. 10

METHOD AND APPARATUS FOR IMPLEMENTING A FULLY DYNAMIC LOCK-FREE HASH TABLE

RELATED APPLICATION

This application hereby claims priority under 35 U.S.C. § 119 to U.S. Provisional Patent Application No. 60/456,786, filed on 21 Mar. 2003, entitled, "Fully Dynamic Lock-Free Hash Table," by inventor Paul A. Martin.

BACKGROUND

1. Field of the Invention

The present invention relates to the design of lookup structures within computer systems. More specifically, the present invention relates to a method and apparatus for implementing a fully dynamic lock-free hash table.

2. Related Art

Linear hash tables are commonly used to provide fast lookups for computer systems and computer applications. A linear hash table includes an array of buckets, which is occasionally resized so that on average each bucket holds an expected constant number of elements. This ensures that common hash table operations, such as insert, delete and search, require an expected constant time. For example, hash table 100 in FIG. 1 includes a bucket array 102, wherein each bucket includes a pointer to a linked list of data nodes. For example, bucket array 102 includes pointers 104, 110, and 114, which point to linked lists that include data 106-108, data 112-113, and data 116, respectively. In order to resize hash table 100 when the buckets become too full, each of the data nodes is typically "rehashed" into a larger bucket array.

The design of such hash tables becomes more complicated in a multi-threaded environment, because concurrently executing threads can potentially interfere with each other while performing operations on the same hash table. In order to prevent such interference, some hash table implementations use locks to prevent different threads from interfering with each other.

However, using locks can create performance problems. Locking an entire hash table can create a performance bottleneck because threads may have to wait for other threads to complete their hash table operations before obtaining access to the hash table. To mitigate this problem, some concurrent hash table implementations make use of multiple locks, which are associated with portions of the hash table. For example, if a hash table has N buckets, a different lock can be associated with each of the N buckets. This allows multiple threads to access different buckets in the hash table at the same time. However, in order to resize the hash table into a different number of buckets, the system has to first collect multiple locks, which can be an extremely time-consuming process. During the resizing process, all other operations dependent on these locks are prevented from making progress.

Because of the performance problems that arise from locks, a number of researchers have been developing lock-free data structures that operate efficiently in a multi-threaded environment.

Harris describes a way to build and modify a linked list that is lock-free and can be constructed using only load-linked (LL)/store-conditional (SC) or compare-and-swap (CAS) instructions (see Timothy L. Harris, "A Pragmatic Implementation of Non-Blocking Linked-Lists," *Proceedings of the 15th International Symposium on Distributed Computing*, October 2001, pp. 300-14). The Harris list forms the basis of the two state-of-the-art lock-free hash tables described below.

The dynamic lock-free hash table by Michael is set up with a bucket array of a chosen size and an empty set of data nodes (see Maged M. Michael, "High Performance Dynamic Lock-Free Hash Tables and List-Based Sets," *The 14th Annual ACM Symposium on Parallel Algorithms and Architectures*, pages 73-82, August 2002). In the hash table of Michael, data nodes are added to the linked lists associated with each bucket, and can be deleted when they are no longer wanted in the hash table. Unfortunately, if the hash buckets get to be "too full", there is no way described to increase the number of buckets to reduce the average load. (Michael uses a slightly simpler variant of the Harris linked-list as the underlying structure to store the data nodes for each bucket.)

The split-list hash table by Shalev and Shavit is able to grow by doubling the size of the buckets table up to a pre-allocated limit (see Ori Shalev and Nir Shavit, "Split-Ordered Lists—Lock-free Extensible Hash Tables," *Proceedings of the Twenty-Second ACM Symposium on Principles of Distributed Computing*, pages 102-111, Jul. 13-16, 2003, Boston, Mass.). This doubling involves adding a new "usable" segment that is as big again as the part already in use, and filling it with "uninitialized" values so that references to these new buckets will set themselves up properly, as described below. Their key improvement is that the data nodes of the table are maintained in a single long linked-list (such as Harris') and do not need to be moved when the number of hash buckets changes (see FIG. 2A). This innovation requires using a special hash function similar to a design by Litwin et al. that orders the buckets to permit recursive splitting of the list (see Withold A. Litwin, "Linear Hashing: A New Tool for File and Table Addressing", *Proceedings of the Sixth Conference on Very Large Data Bases*, 1980, pages 212-223). The recursive splitting of the hash buckets means that every bucket (except the $0^{th}$ one) has a "parent" bucket that is in some sense twice as coarse in dividing up the linked list.

The proper setup for Shalev-Shavit buckets is to have each bucket that has been referenced during a hash table operation point to a permanent dummy node in the otherwise-dynamic linked list that holds all the data nodes (see FIG. 2A). These dummies are assigned special hash keys, which are designed to fall in between the hash keys that are possible for real data nodes.

FIG. 2A illustrates a split-ordered list hash table with bit-reversed bucket pointers in which bucket array 202 includes pointers 204, 210, and 214. Pointers 204, 210, and 214 point to permanent dummy nodes 205, 211, and 215, respectively. Permanent dummy node 205 points to a linked list including data nodes 206-208, permanent dummy node 211 points to a linked list including data nodes 212-213, and permanent dummy node 215 points to a linked list starting with data node 216. Note that data node 208 points to permanent dummy node 211 and data node 211 points to permanent dummy node 215. In general, the last data node in a given region points to the next permanent dummy node within the linked list.

The dummy nodes serve as place holders so that entering the linked list by way of the hash bucket will always provide a pointer to a dummy node that is at the head of the region associated with that portion of the hash mapping. Once a bucket pointer has been initialized with a pointer to the corresponding dummy node, it does not change.

These dummy nodes are essential to the correctness of the Shalev-Shavit hash table and can never be deleted. Their algorithm also offers no way to reduce the size of the bucket array. Consequently, as a hash table grows it may add many dummy nodes, but as its contents are deleted the dummy nodes must remain, leaving, in some cases, a large structure of buckets and dummies with very little actual data remaining.

Additionally, the sharing of bucket array elements as the bucket table grows dictates that the space for the growing segments of the bucket array must be pre-allocated sequentially with the initial portions, so that the space taken by the bucket array at all times is effectively the space it will take when it has reached the maximum size supported. This is an expensive overhead when the "live" portion of the array space is a small portion of the allocation, and, more seriously, it puts a limit that must be set initially on the ultimate size the bucket array may ever reach.

A later addendum to the Shalev-Shavit hash table uses additional indirection to ease this problem. It allocates a table of pointers to bucket table segments, and allocates the actual segments upon demand. This scheme reduces the bucket table overhead, but the pointer table is fixed size and must be pre-allocated, and any segment ever used must be retained.

Hence, what is needed is a method and apparatus for implementing a fully dynamic lock-free hash table without the overhead involved in having to maintain a large number of buckets and dummy nodes. By fully dynamic we mean a data structure wherein the space consumed is proportional to the number of items actually in the hash table at any time.

SUMMARY

One embodiment of the present invention improves on the Shalev/Shavit by allowing the size of the bucket array to grow or shrink without requiring initial allocation of storage to support the maximum size, and allows dummy nodes that are no longer needed (due to shrinking the bucket array size) to be safely deleted.

Another embodiment functions without requiring dummy nodes in the linked list of data nodes. During a lookup in the hash table, the system first uses a hash key to find a bucket pointer in a bucket array. Next, the system follows the bucket pointer to a data node within a linked list that contains all of the data nodes in the hash table, wherein the linked list contains only data nodes and no dummy nodes. The system then searches from the data node through the linked list to locate a node that matches the hash key, if one exists.

Deleting the data node from the linked list can involve using an atomic operation to mark the data node as dead, and then a second atomic operation updating the next pointer of the predecessor of the data node to point around the data node to the successor of the data node in the linked list. (Note that the atomic operation can include any one of a number of different atomic operations, such as a compare-and-swap operation or a load-linked/store-conditional operation.)

In a variation on this embodiment, deleting the data node from the linked list additionally involves redirecting the next pointer of the deleted data node to become a back pointer that points to the predecessor of the deleted data node. Such redirection operations redirect the bucket pointer to a portion of the data list that falls before the deletion, and this is useful as a search point for this bucket.

In a further variation, if a subsequent search through a chain of nodes from the back pointer does not lead to a live node, the system reinitializes the bucket pointer, using the procedure similar to that used initially to set a bucket pointer. It obtains a "parent" bucket pointer from the bucket array, then searches through the data linked list from a node pointed to by the parent bucket pointer to locate a starting node for the bucket pointer. When such a node is found, the system updates the bucket pointer to point to the predecessor node of the first node that logically belongs in this bucket.

In a variation on this embodiment, deleting the data node from the linked list involves using a modified lock-free reference counting scheme such as the Moir et al. solution to the Repeat Offender Problem to reclaim the data node as soon as no live references to it remain. The Repeat Offender mechanism is described in a paper by Maurice Herlihy, Victor Luchangco and Mark Moir, entitled "The Repeat Offender Problem: A Mechanism for Supporting Dynamic-Sized, Lock-Free Data Structures," *Proceedings of Distributed Computing*, 16th International Conference, DISC 2002, Toulouse, France, Oct. 28-30, 2002, pp. 339-353.

In yet a further variation, in order to initialize a bucket pointer, the system first obtains a parent bucket pointer for the bucket pointer. Next, the system searches through the linked list from a node pointed to by the parent bucket pointer to locate a starting node for the bucket pointer. Finally, the system updates the bucket pointer to point to the node immediately before the starting node.

In a variation on this embodiment, the data nodes are stored in the linked list in bit-inverted hash key order. In this variation, doubling the number of buckets in the bucket array involves mapping the old smaller bucket array into the first half of the new larger bucket array.

In a variation on this embodiment, the data nodes are stored in the linked list in hash key order, and the pointers assigned in a bucket table are arranged to point proportionately into this list. In this variation, doubling the number of buckets in the bucket array involves interleaving the working bucket array pointers into the larger allocated bucket array.

In a variation on this embodiment, if the average number of data nodes in each bucket falls below a minimum value, the system halves the number of buckets in the bucket array to form a smaller bucket array. The system subsequently uses one fewer bit from the hash key to perform lookups in the smaller bucket array.

BRIEF DESCRIPTION OF THE FIGURES

FIG. 9 presents a flow chart illustrating how the number of buckets in a hash table is increased in accordance with an embodiment of the present invention.

FIG. 10 presents a flow chart illustrating how the number of buckets in the hash table is decreased in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Split-List Hash Table with Deletable Dummy Nodes

One embodiment of the present invention provides a system that implements a hash table that is fully dynamic and lock-free. It shares the split-ordered list design of using a single linked list for all the data, with dummy nodes (that are deleted when no longer needed) to segment this list. But by substituting a new larger or smaller bucket array for the "old" one, the hash table can grow and shrink without limit as needed by the size requirements of the data. An included operation set covers incrementally moving the bucket pointers from the old array to the new one and deleting the unneeded dummies in the case where the new bucket array is smaller than the old one.

Figure 1:
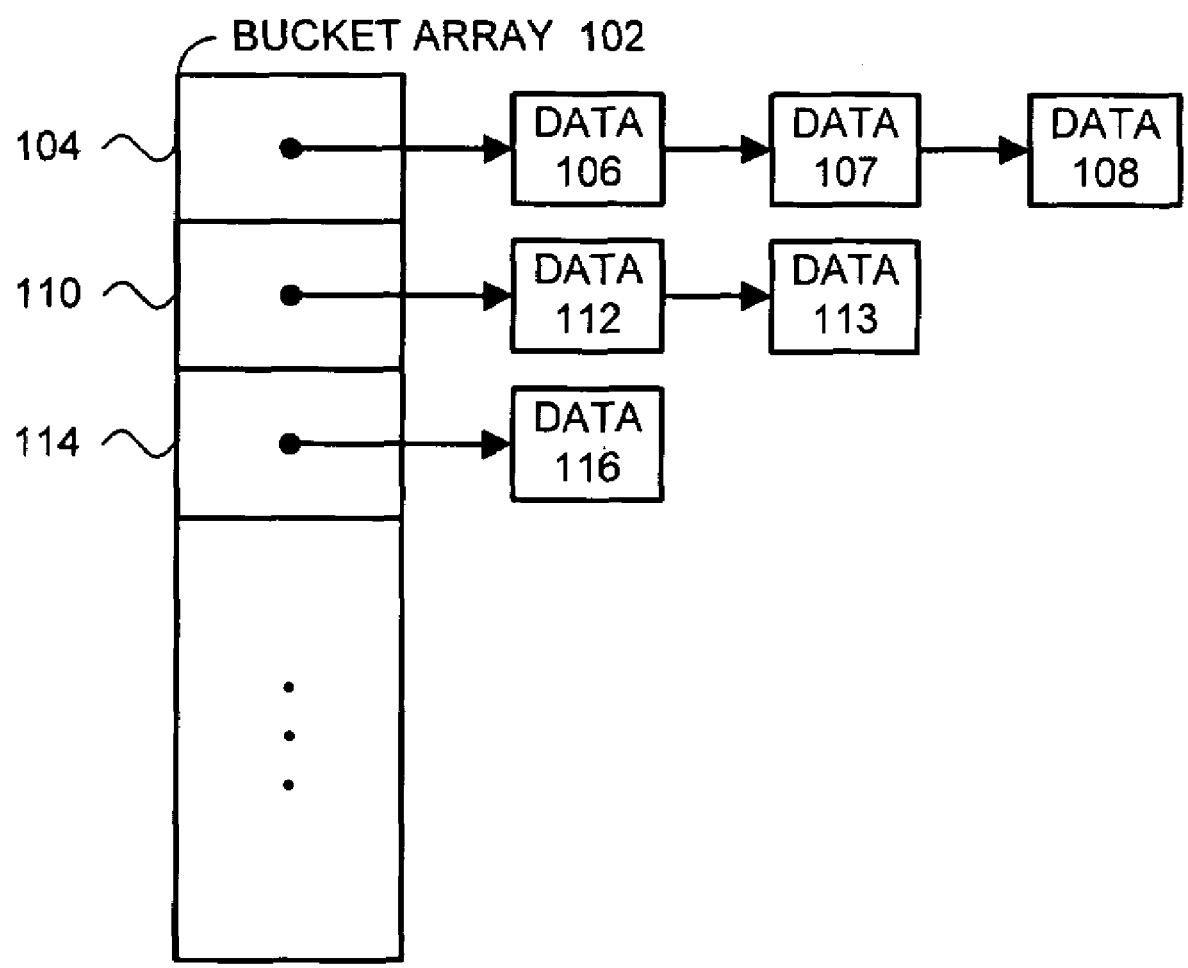
FIG. 1 illustrates a hash table.
Figure 2A:
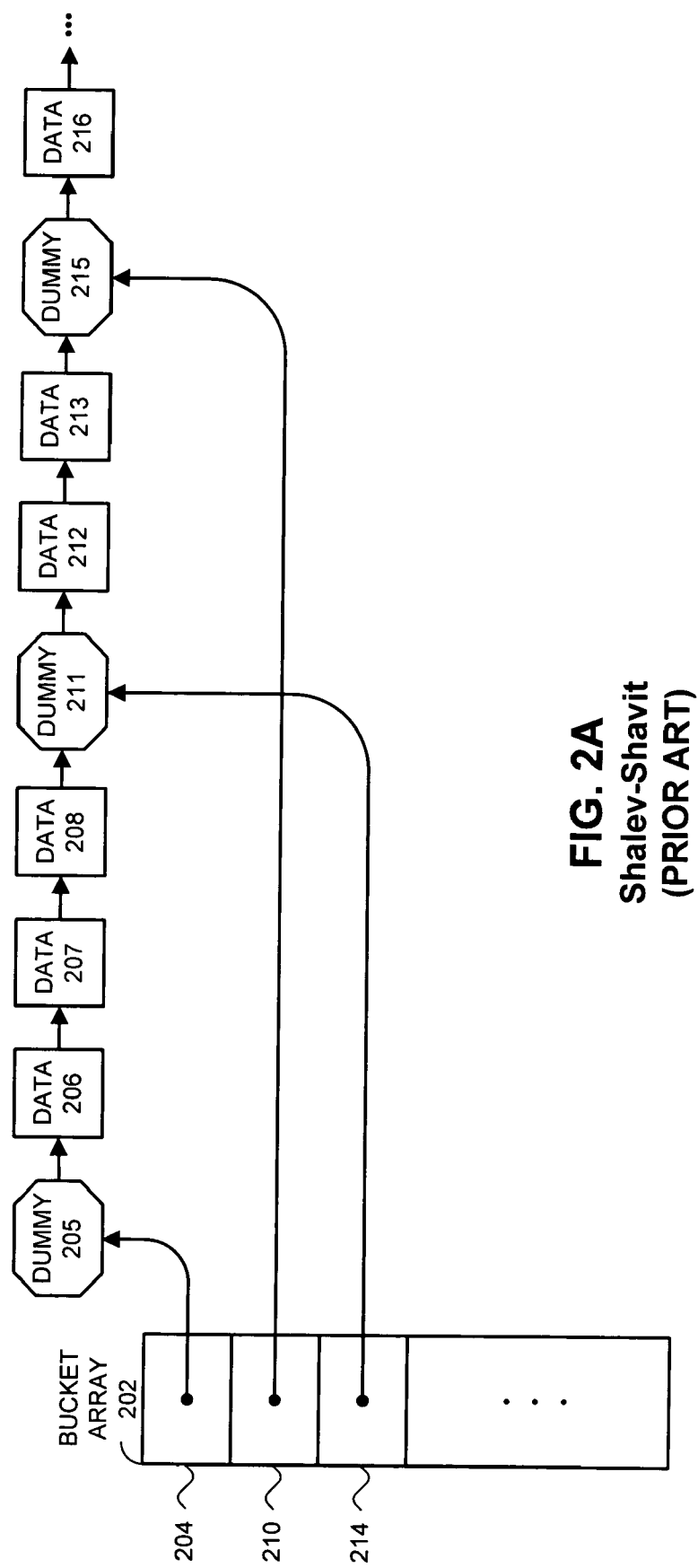
FIG. 2A illustrates a split-ordered list hash table with bit-reversed bucket pointers.
Figure 2B:
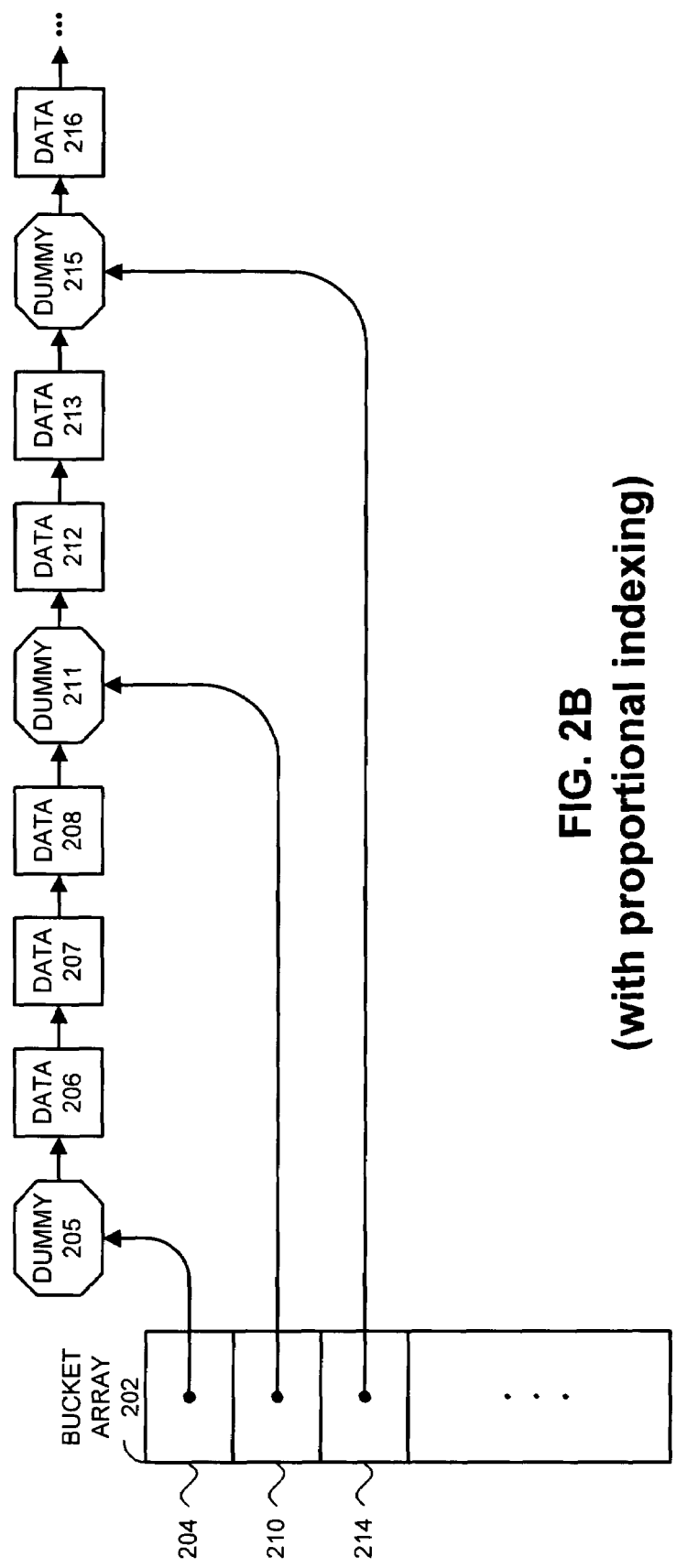
FIG. 2B illustrates a split-ordered list hash table with proportional bucket pointers.
Figure 2C:
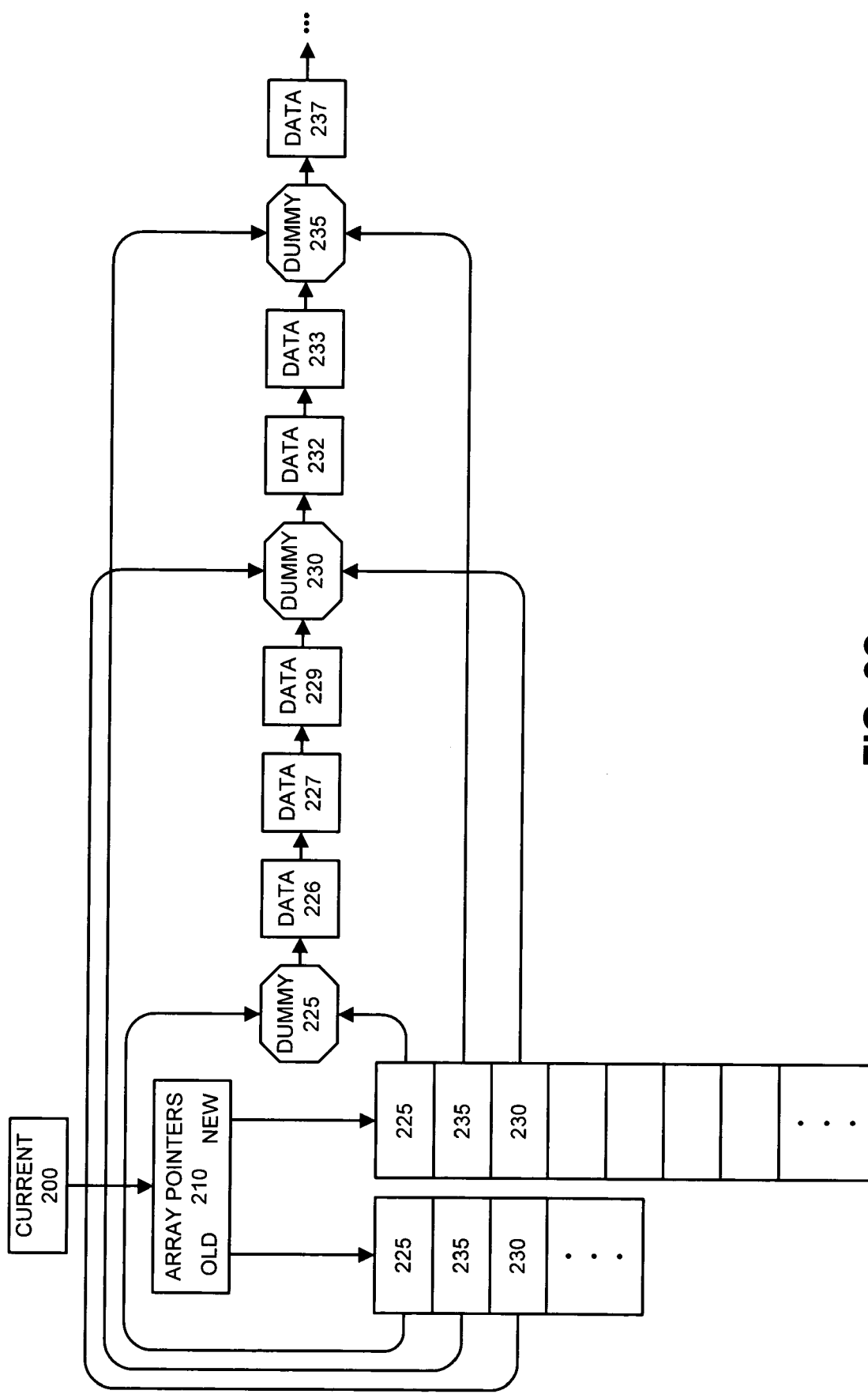
FIG. 2C illustrates a split-ordered list hash table with new/old bucket arrays and deletable dummy nodes in accordance with a bit-reversed indexed embodiment of the present invention.

FIG. 2C illustrates such an embodiment at a stage when the hash table bucket array had been determined to be too small and was replaced by a new one twice as large.

In the above-described embodiment of the present invention, the bucket array is allocated to the size needed initially, and filled with a special "uninitialized" value in all cells except the first one, which is set to point to a dummy node that is the head anchor of the empty list of nodes.

Figure 2D:
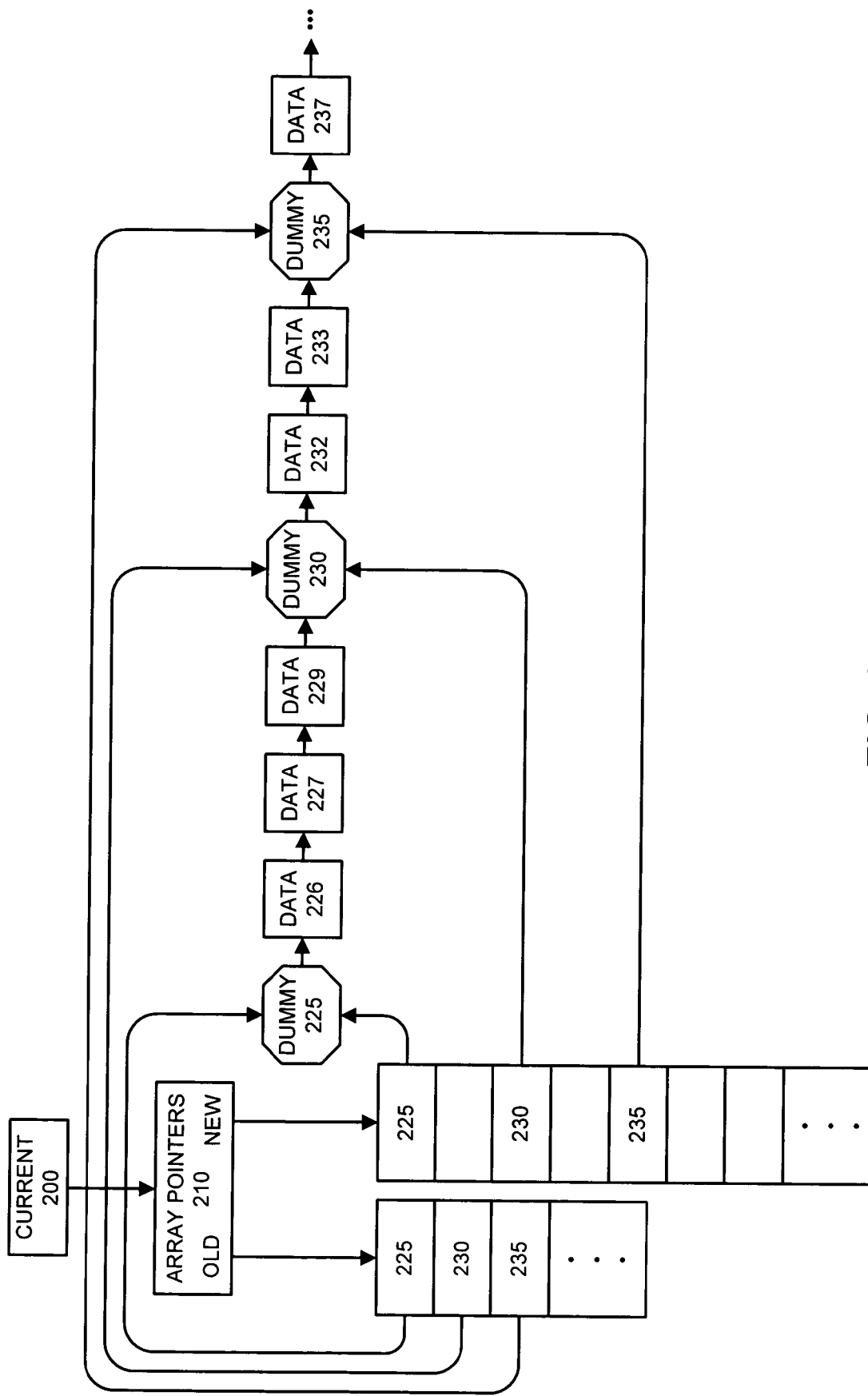
FIG. 2D illustrates a split-ordered list hash table with new/old bucket arrays and deletable dummy nodes in accordance with a proportional indexed embodiment of the present invention.

As nodes are added to the hash table, the bucket array is filled in to point to dummy nodes added at locations statistically likely to evenly divide the linked list of the data, which includes data nodes 226, 227, 229, 232, 233, and 237. For example, old array includes pointers 225, 235, and 230, which point to dummy nodes 225, 235, and 230, respectively. When the average number of nodes associated with a bucket becomes excessive, a process creates a new bucket array that is twice as large as the old one, initializes it as described in the previous paragraph, creates a "bucket tables" structure (210 in FIG. 2C) to hold the old array as "old" and the new one as "new", and then atomically switches the "current" pointer (200 in FIG. 2C) of the hash table to the new structure. During initialization of the new array, pointers 225, 235, and 230 are copied from the old array. FIG. 2D illustrates a split-ordered list hash table with new/old bucket arrays and deletable dummy nodes in accordance with a proportional indexed embodiment of the present invention. In the proportional indexing embodiment, the data elements are the same as in FIG. 2C, but the pointers are reordered to point to data elements as described below.

Lookups are now done in the new bucket array, and when a cell is found uninitialized the corresponding cell of the old bucket array is copied if there is one and if it has been initialized. If no corresponding bucket from the old array is available, the procedure uses the parent bucket in the new array.

Should the average number of nodes per bucket become too small, a similar action can establish a "bucket tables" structure with the new array half the size of the old one. The same sort of incremental copying moves the bucket pointers from the old bucket array cells to the new one, but when the old array is larger than the new one there is an additional chore to complete; the dummies that are used by the old array but NOT by the new one must be deleted in a manner that ensures that they are all gone before the old array is abandoned.

One way to achieve this dummy deletion is to include in the "bucket tables" structure a pointer to the lowest index in the "old" table of a dummy node that should be deleted but has not yet been deleted. Until this index reaches the end of the bucket table, each hash table operation is "taxed" with attempting to delete the next surplus dummy, and if successful, atomically moving the index to the next potential surplus dummy. It is convenient to set a special "all done" value (such as zero) in this index when no more deletions are needed. None are needed in the initial case where there is no old table, and also whenever the new table is larger then the old one.

This embodiment allows the bucket array to adjust to the optimum size for any given load of the hash table and removes any dummy nodes that are no longer needed to support the hash table structure.

Split-List Hash Table without Dummy Nodes

Figure 3A:
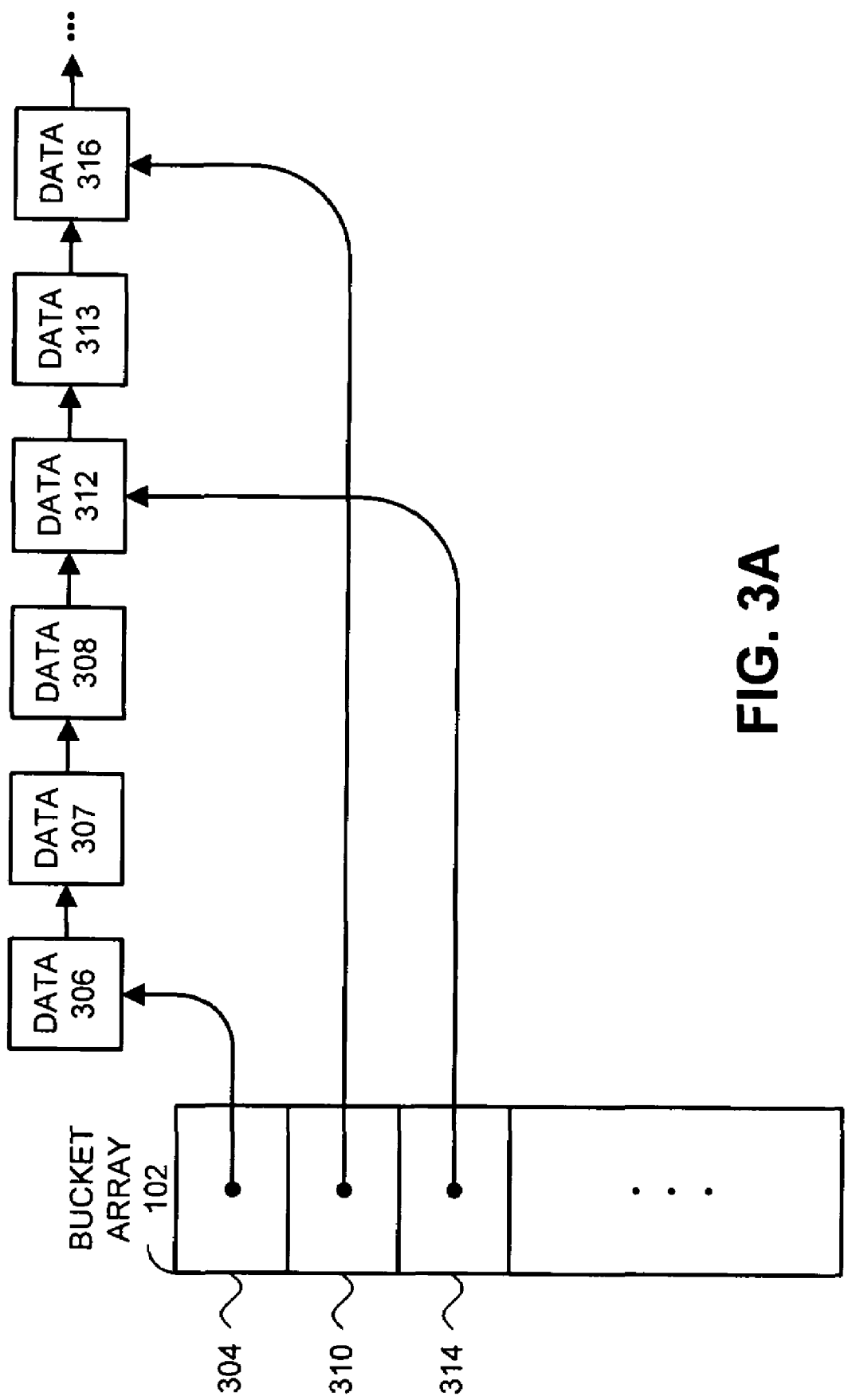
FIG. 3A illustrates a split-ordered list hash table without dummy nodes in accordance with a bit-reversed indexing embodiment of the present invention.
Figure 3B:
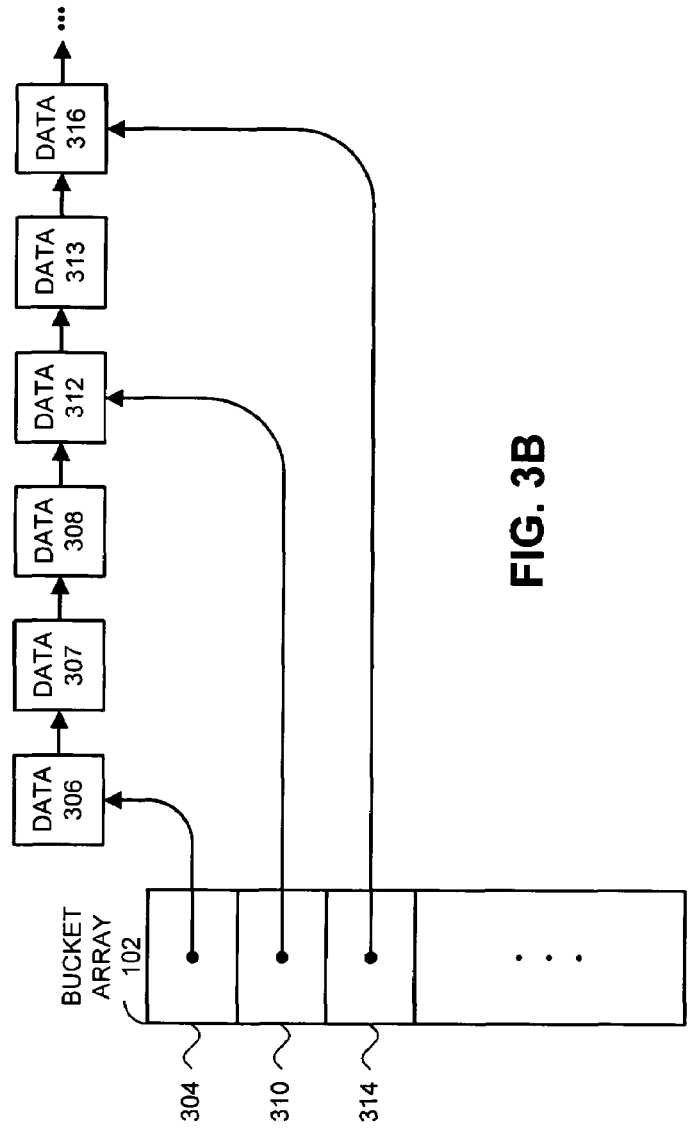
FIG. 3B illustrates a split-ordered list hash table without dummy nodes in accordance with a proportional indexing embodiment of the present invention.

Another embodiment of the present invention improves on Shalev-Shavit by removing the need for dummy nodes as illustrated in FIGS. 3A and 3B. For example, FIG. 3A illustrates a linked list of data nodes including data nodes 306-308, 312-313, and 316 and pointers 304, 310, and 314 in bucket array 102 pointing directly to data nodes 306, 316, and 312, respectively. Removing the dummy nodes saves space proportional to the largest number of buckets ever used with the hash table. Moreover, it allows arbitrarily large growth instead of requiring that the bucket array be allocated initially for the maximum size it will ever become. It also allows arbitrarily small (the restriction is two or more buckets) bucket tables, thereby freeing the storage used by the hash table in a previous period when it was larger. FIG. 3B illustrates a split-ordered list hash table without dummy nodes in accordance with a proportional indexing embodiment of the present invention. In the proportional indexing embodiment, the data elements are the same as in FIG. 3A, but the pointers point to different data elements. Pointer 310 points to data element 312 and pointer 314 points to data element 316 as described below.

Figure 5:
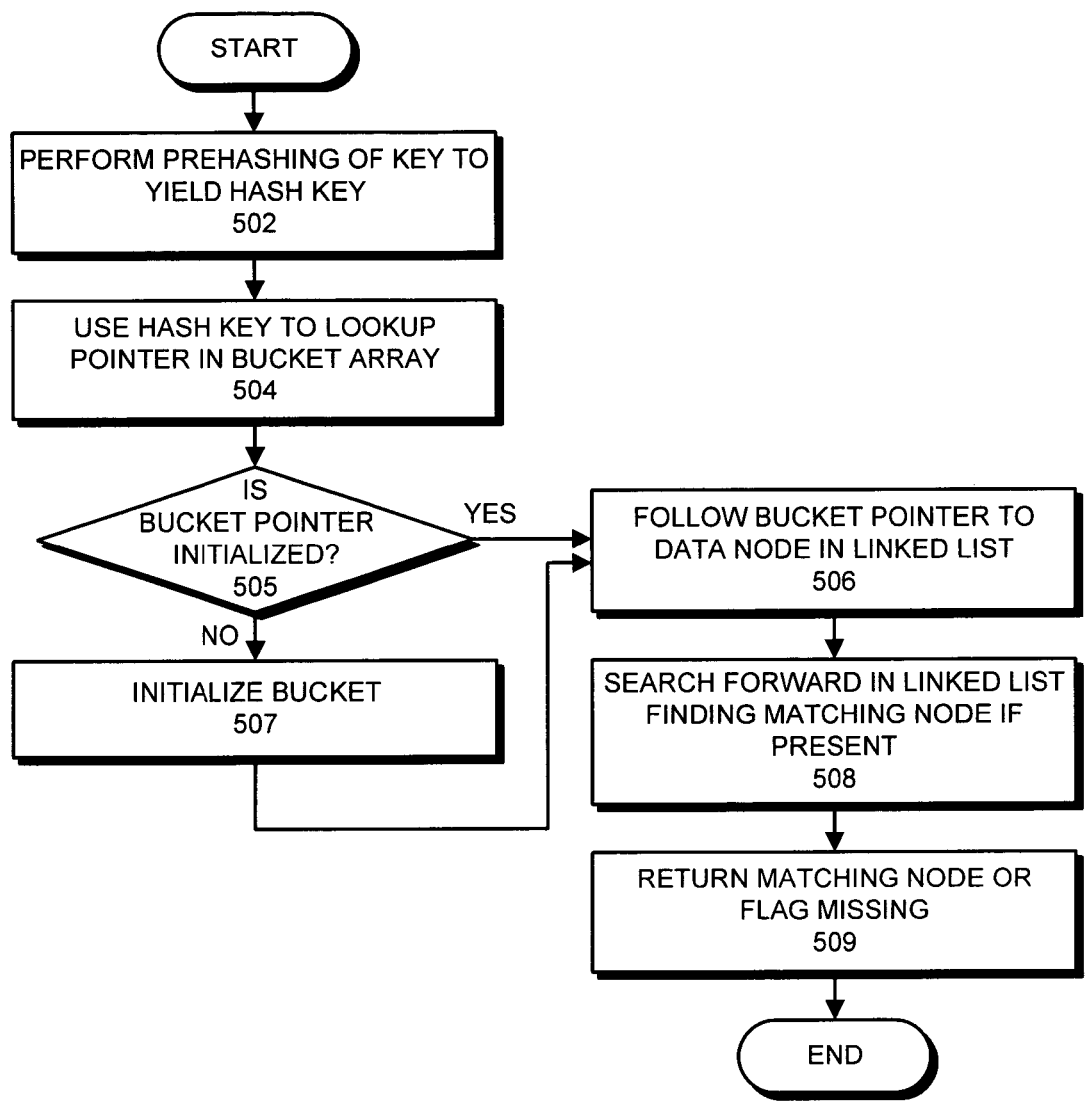
FIG. 5 presents a flow chart illustrating a hash table search operation in accordance with an embodiment of the present invention.

In the above-described embodiment of the present invention, the hash search operation is similar to the hash table search operation described in Shalev/Shavit. Referring to the flow chart in FIG. 5, the system first performs a pre-hashing operation to generate a hash key that achieves a substantially uniform distribution of hash keys over possible hash key values (step 502). Next, the system uses the hash key and the size of the bucket array to lookup a bucket pointer in a bucket array (step 504). The system then determines if the bucket pointer is initialized (step 505). If not, the system (step 507) uses the method portrayed in FIG. 8 to initialize the bucket. Initializing a bucket is a possibly recursive operation; it may require initializing the parent bucket before the bucket can be initialized. Once the bucket is initialized, the system then returns (507) and proceeds to step 506.

Once the bucket pointer is initialized, the system follows the bucket pointer to a data node in the linked list (step 506). Next, the system performs a search starting from the data node to locate a node that matches the hash key, if one exists (step 508). The system then either returns the matching node or reports that the requested node is missing (step 509).

While a system using dummy nodes can arrange to have the dummies fall "between" the real valued nodes, a linked list without dummies must always point the bucket array cells at a real data node that falls before the first real data node that would follow the dummy, had there been one. By treating the bucket pointers as hints that always point before the first data node in the bucket, we can guarantee that a search starting from one will not miss a more recently inserted node.

After any access to the hash table, the bucket pointer used is changed to point to the real data node that has the highest hash key that is LESS than the keys that should be "in" this bucket (if it doesn't already do so). This is the node that would fall just before the dummy in the Shalev/Shavit algorithm. Subsequent additions to the "previous" bucket may add nodes after this one which also belong in the "previous" bucket, so adjusting the bucket pointer is done whenever it no longer points before the first data node of the corresponding bucket.

One embodiment of the present invention modifies the underlying Harris linked list to include backward pointing recovery hints in the nodes that have been deleted. These nodes serve the "permanence" role of the dummy nodes in the Shalev/Shavit hash table, but can be recovered (e.g., garbage collection) instead of remaining forever a part of the hash table.

Node Deletion

The Harris linked list deletes a node by first marking a special DEAD bit that is part of the pointer cell where the NEXT pointer is stored. Once the DEAD bit is set, the node is logically deleted. Keeping this dead bit in the pointer word provides the atomicity needed to allow exactly one process, in one atomic instruction, to claim the node in a way that is public to all other threads, concurrent or subsequent. Once the DEAD bit is set, the process deleting the node can atomically alter the NEXT pointer of the predecessor of the dead node to point around it to the next live node. (Michael's and our use of the Harris list simplifies this—we don't look for a live node but just splice to the node that the deleted one was already pointing to, even if that node is also deleted.) Once the splicing-around step is completed, no live node in the linked list points to the deleted node.

Bucket pointers that point to dead nodes are no longer useful, but a recovery through the "parent" node as in initialization will allow the search to succeed and eventually remove the references to the dead node, allowing the garbage collector or another process to collect the storage it consumes. This approach is simple and effective, but requires a recovery-from-parent step whenever the node that is pointed to by a bucket cell is deleted.

Back-Linked Lists

One embodiment of the present invention uses these dead nodes in one further way; until some thread has spliced the list to point around a dead node, the NEXT pointer of that node is the only source of information to allow other threads to follow the linked list. It is literally holding the list together (in the case where the thread doing the deletion stalls) and so it cannot be altered or removed until the list is spliced around it. But once a node is spliced around, we can use its NEXT pointer for a different purpose—we redirect it back to the previous predecessor node. Thus, a thread that follows this back pointer may quickly find a live node that precedes this node in the list.

Subsequent operations following the next pointer of live nodes will not see this node (it has been spliced around). However, threads that were stalled while it was being deleted may remember it as the NEXT of its (possibly former) predecessor node, and it may be pointed to by one or more bucket pointers.

The thread that finds the node with a backward pointer can tell that the pointer is not a normal forward one—either because an additional BACK bit is set in the pointer word or by comparing the hash key of the node pointed to by the bucket pointer (either stored in the cells or computed on the fly from the real stored value) to the previous one and noting that they are out of order.

Figure 4:
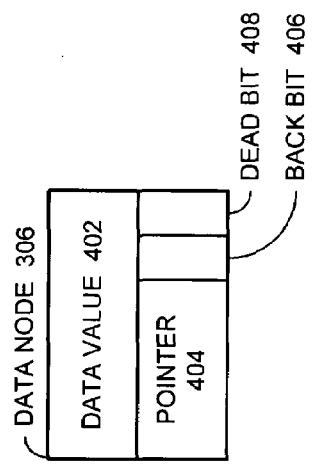
FIG. 4 illustrates a data node in accordance with an embodiment of the present invention.

Referring to FIG. 4, in one embodiment of the present invention, each data node 306 includes a data value 402, as well as a next pointer 404. The two lower order bits of the next pointer can be used as BACK bit 406 to indicate that pointer 404 is a back pointer, and a DEAD bit 408, to indicate that the data node is dead. (The standard addressing modes of modern computers allocate sufficient bits in the address to specify single bytes, and the nodes used in a linked list must be at least bytes long, so there are logically at least two bits available, and the DEAD bit uses just one)

Figure 6:
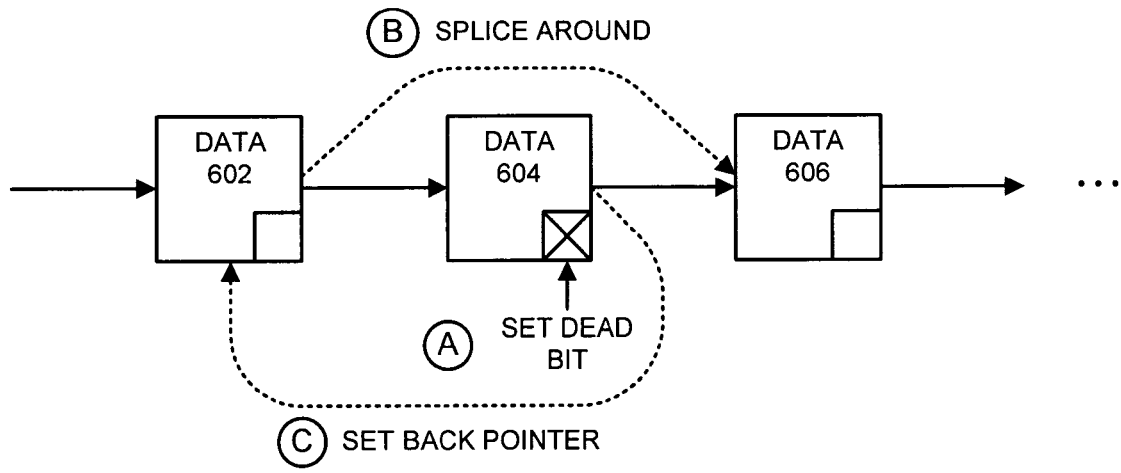
FIG. 6 illustrates a node deletion operation in accordance with an embodiment of the present invention.
Figure 7:
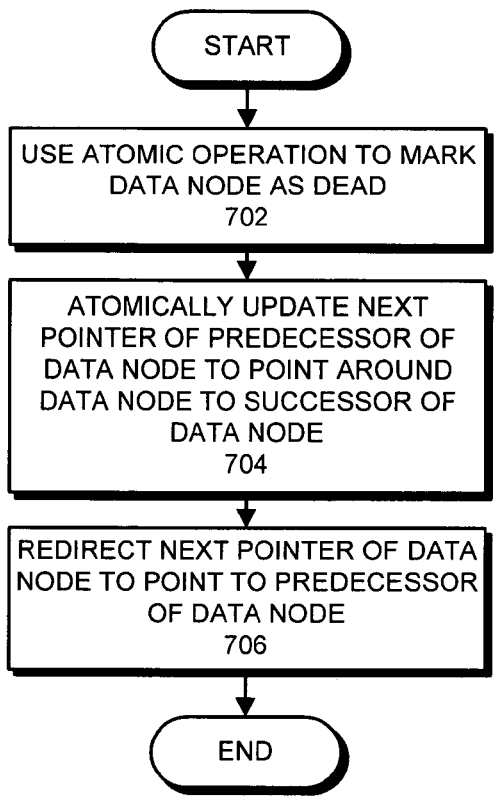
FIG. 7 presents a flow chart of a node deletion operation in accordance with an embodiment of the present invention.

Referring to FIGS. 6 and 7, in one embodiment of the present invention, the system deletes a data node by first using an atomic operation to mark that data node 604 as dead (step A and step 702). Next, the system atomically updates the next pointer of the predecessor 602 of data node 604 to point around data node 604 to the successor 606 of data node 604 (step B and step 704). Finally, the system redirects the next pointer of data node 604 to point to the predecessor 602 of data node 604 (step C and step 706).

Following backwards pointers may eventually encounter a deleted node that is still pointing forward; the deletion process for this node was not "finished". However, the thread following the backward pointer does not have sufficient information to finish the deletion.

Recovering from a Bad Pointer Chain

Figure 8:
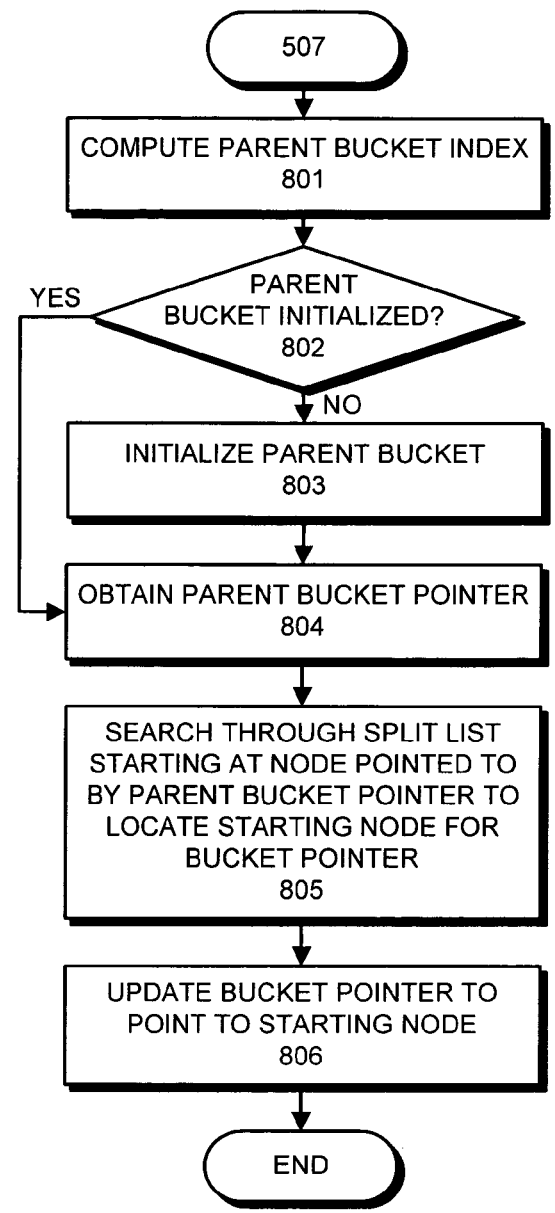
FIG. 8 presents a flow chart illustrating how a bucket pointer is updated or initialized in accordance with an embodiment of the present invention.

The recovery from finding that a backward chain fails to lead to a live node is the same as discovering a bucket pointer is not yet initialized. The process uses the "parent" bucket pointer to find the correct starting point in the split-list, and then updates the "bad" bucket pointer for subsequent use. Referring to FIG. 8, the system first computes the parent bucket index. (step 801). The system then determines if the parent bucket is initialized (step 802). If not, the system initializes the parent bucket (step 803). Next, the system obtains the parent bucket pointer from the parent bucket (step 804). The system then searches through the list starting at the node pointed to by the parent bucket pointer to locate a starting node for the bucket pointer (step 805). (This starting node is the predecessor node of the first node encountered that should fall within the bucket.) The system then updates the bucket pointer to point to the starting node (step 806). Using an atomic update such as CAS blocks stalled threads from writing old values here.

The above-described technique works recursively if the parent bucket is also uninitialized or pointing to a forward-pointing deleted node.

An effective way to use the BACK pointers while avoiding possibly wasting a large amount of effort is to pursue BACK pointers and the recursive parent-based recovery in parallel—take a single step along both recovery paths and stop recovering when either succeeds. Notice that this strategy may lead us to also pursue a chain of back pointers from a deleted node found while following the parent bucket pointer, or its parent bucket pointer, etc. This parallel recovery scheme limits the depth of descent to the minimum caused by either method at the price of multiplying the effort (though still just a constant factor) at each stage.

Shrinking/Growing the No-Dummy Nodes Hash Table

The overall design of the no dummy nodes hash table makes reducing the number of buckets very easy—just reset (CAS) a CurrentSize limit to half the previous size (subject to a minimum size) and set (CAS) a pointer to the high bucket index that needs to be cleaned to "uninitialized" to allow GC (or ROP) to claim the DEAD nodes that may be pointed to by the now-unused buckets. This cleaning work can be farmed out to be done as a side chore by each access to the hash table until all the cleanup is done (producing low delays for all calls) or can just done entirely by the thread that decided to shrink the table.

With deleting dummy nodes, this no-dummy nodes version does not have to wait for completion of the cleanup.

Both growing (described by Shalev/Shavit) and shrinking (described above) assume that the array size allocated for the bucket array is not changed, but this is an unnecessary restriction. By creating a new bucket pointer array that is the new size (say either twice or half the size of the now-christened "old" one), we can remove the limitation to the initially allocated array size. While there is a "new" bucket array, the process is altered to look there first, and if the bucket is not initialized, look in the corresponding bucket of the "old" table, copying its contents if they have been initialized. The switching to a new table is done atomically in a manner similar to the one described for the hash table wherein dummy nodes were deleted upon shrinking the table.

The task of copying the contents of the part of the old table that corresponds to the new one can be handled by a number of methods, since only efficiency, the amount of work that is "taxed" to a given hash table operation, and the overall period of use of the storage are affected—these choices do not impact the correctness of the algorithm.

Referring to FIG. 9, the task of growing the number of buckets in the bucket array is typically triggered by a node insertion operation that adds a data node to the hash table (step 902). If adding this data node causes the average number of data nodes per bucket to exceed a maximum value (step 904), the system increases (typically doubles) the number of buckets in the bucket array (step 906). The system subsequently uses one additional bit from the hash key (in the case of doubling) to perform lookups in the larger bucket array (step 908), and then initializes the buckets as they are referenced during subsequent hash table operations (step 910).

Referring to FIG. 10, the task of shrinking the number of buckets in the bucket array is typically triggered by a node deletion operation that deletes a data node from the hash table (step 1002). If deleting the data node causes the average number of data nodes per bucket to fall below a minimum value (step 1004), the system reduces (typically halves) the number of buckets in the bucket array (step 1006). The system subsequently uses one less bit (in the case of halving) from the hash key to perform lookups in the smaller bucket array (step 1008).

Variation on Recursive Split-Ordering

One potential problem with the Shalev/Shavit hash table concerns the use of "recursive split-ordering" to sort the elements in the linked list. The recursive split-ordering is achieved by simple binary bit reversal: reversing the order of the bits of the hash key so that the new keys' most significant bits are those that were originally its least significant. Because every operation of the Shalev/Shavit hash table implementation must search in the linked list of elements, every operation must perform this binary reversal. In addition, every node must store the bit-reversed key, or a bit-reversal must be performed for each node accessed. Reversing bits, while conceptually simple, is not directly supported in most computer hardware, and consequently may be relatively expensive. The best-case cost for performing a bit reversal is bounded by log N for N bits of data.

Shalev and Shavit have described the use of the recursive split-ordering as "the key algorithmic breakthrough" of their hash table algorithm. Because their linked list is kept in recursive split order, using the low-order bits of the original hash key as the index into the bucket array—that is, the function to hash keys into $2^N$ buckets simply takes the remainder of the bit-reversed key after dividing it by $2^N$—causes the keys to be distributed evenly among the buckets. But it also causes the keys in the range $2^k$ to $2^{k+1}$ to be spread evenly sub-dividing the range covered by the keys in the range 0 to $2^k-1$.

Therefore, when the number of buckets is doubled from $2^N$ to $2^{N+1}$, a key that hashed to bucket i in the smaller table hashes to either bucket i or bucket ($i+2^N$) in the larger table. Thus, the first half (i.e., the half with the smaller numbers) of the new bucket array is just a copy of the old bucket array. Indeed, Shalev and Shavit exploit this property to avoid copying the old array; it becomes just the first half of their new array.

In the code presented by Shalev and Shavit in their paper, there is always sufficient space to avoid copying when increasing the number of buckets because they pre-allocate an array of MAX_TABLE_SIZE potential buckets and do not increase the number of buckets when it would exceed MAX_TABLE_SIZE. This approach restricts the applicability of their algorithm to applications in which a reasonable value for MAX_TABLE_SIZE can be determined ahead of time, and where pre-allocating that much storage for a table is acceptable. As we described, it is straightforward for one skilled in the art to extend their scheme to eliminate this restriction by using the "table doubling" technique. This technique requires that the table be copied when the number of entries in the table (i.e., the number of buckets) is increased (the cost of copying is amortized over the insertions and deletions as described above).

When we copy the old array into the new array, we need not copy the old array directly into the top half of the new array; we can use any injective mapping (i.e., one in which no two elements map to the same result) from entries in the old array to entries in the new array, copying the bucket pointer from the old array directly into its corresponding entry in the new array. Specifically, if we "interleave" the entries corresponding to buckets in the old array with entries that correspond to new buckets, we can eliminate the need for bit-reversal, as we describe in the next paragraph.

In this new approach, the linked list of nodes containing the elements in the hash table is ordered in increasing (original) hash key order, rather than according to the recursive split-ordering of their hash keys See FIG. 2B). In FIG. 2B, the elements are the same as in FIG. 2A except that pointer 210, points to dummy 211 and pointer 214 points to dummy 215. Furthermore, in a bucket array of size $2^N$, the index of the bucket for an element is determined by the N "high-order" bits of its key. Thus, if a key has K bits, then bucket i contains those elements whose keys are in the range $i(2^{K-N})$ to $(i+1)(2^{K-N})-1$. When the number of buckets is increased to $2^{N+1}$, bucket i is split into buckets 2i and 2i+1, where bucket 2i corresponds to bucket i in the old bucket array, and bucket 2i+1 is the new bucket whose "parent" is the old bucket i (now bucket 2i). Upon encountering an uninitialized bucket at an even index 2i, an operation copies the value at index i in the old array. For uninitialized buckets at an odd index 2i+1, the operation initializes the bucket by looking at its "parent" bucket at index 2i in the new array (which corresponds to index i in the old array). No bit reversals are required in this scheme.

For an application in which pre-allocation of an appropriately sized array is possible and it is desirable to avoid copying, we can reduce the cost of bit-reversal by keeping the linked list in increasing hash key order and using the bit-reversed high order bits of the key as the index into the bucket array. This reduces the cost of bit-reversal because fewer bits need to be reversed.

Alternatively, we can use the same no-reversal method described for multiple bucket arrays but use just the originally-allocated array space. In this variation the table is filled sparsely when not many entries are being used, and the spaces "in between" are filled in as the load on the hash table increases. As an example, a table capable of holding 128 entries might be filled with "uninitialized" and then using only two bits to select buckets it would have only the four entries at 0, 32, 64, and 96 filled in with pointers to the start, first quarter, half, and third quarter points of the linked list of data. When the bucket array is "doubled in place", three bits of the hash code would be interpreted as bucket addresses so that the entries at 16, 48, etc. would also be used along with the ones already described.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a hash table that is fully dynamic and lock-free, comprising:
   performing a lookup into the hash table, wherein the lookup involves,
      using a hash key to lookup a bucket pointer in a bucket array,
      following the bucket pointer to a data node within a linked list containing all of the data nodes in the hash table, and
      searching from the data node through the linked list to locate a node that matches the hash key if one exists;
   wherein the linked list contains only data nodes and at most a constant number of dummy nodes; and
   when the average number of data nodes in each bucket exceeds a maximum value:
      increasing the number of buckets in the bucket array to form a larger bucket array, and
      using more bits from the hash key to perform lookups in the larger bucket array,
      wherein the data nodes are stored in the linked list in bit-inverted hash key order, and
      wherein increasing the number of buckets in the bucket array involves copying the existing bucket array into the top half of the larger bucket array through a single pointer operation.

2. The method of claim 1, wherein the data node pointed to by the bucket pointer precedes the nodes in the bucket.

3. The method of claim 2, wherein deleting the data node from the linked list involves using garbage collection or a solution to the repeat offender problem to reclaim the data node if possible.

4. The method of claim 2, wherein if the average number of data nodes in each bucket falls below a minimum value, the method further comprises:
   reducing the number of buckets in the bucket array to form a smaller bucket array; and
   using fewer bits from the hash key to perform lookups in the smaller bucket array.

5. The method of claim 1, wherein deleting the data node from the linked list involves:
   using an atomic operation to mark the data node as dead; and
   atomically updating the next pointer of the predecessor of the data node to point around the data node to the successor of the data node in the linked list.

6. The method of claim 5, wherein deleting the data node from the linked list additionally involves redirecting the next pointer of the data node to become a back pointer that points to the predecessor of the data node.

7. The method of claim 6, wherein if a search through a chain of nodes from the back pointer does not lead to a live node, the method further comprises:
   obtaining a parent bucket pointer;
   searching through the linked list from a node pointed to by the parent bucket pointer to locate a starting node for the bucket pointer; and
   updating the bucket pointer to point to the starting node.

8. The method of claim 1, further comprising generating the hash key by performing a pre-hashing operation to achieve a uniform distribution of hash keys over possible hash key values.

9. The method of claim 1, wherein buckets in the larger bucket array are initialized on-the-fly as they are referenced.

10. The method of claim 1, wherein initializing a bucket pointer involves:
obtaining a parent bucket pointer for the bucket pointer;
searching through the linked list from a node pointed to by the parent bucket pointer to locate a starting node for the bucket pointer; and
updating the bucket pointer to point to the starting node.

11. The method of claim 1, wherein if there exists an old hash table, initializing a bucket pointer involves looking for a corresponding entry in the old hash table first, and if this fails:
obtaining a parent bucket pointer for the bucket pointer;
searching through the linked list from a node pointed to by the parent bucket pointer to locate a starting node for the bucket pointer; and
updating the bucket pointer to point to the starting node.

12. The method of claim 1,
wherein the data nodes are stored in the linked list in hash key order; and
wherein increasing the number of buckets in the bucket array involves interleaving the bucket array into the larger bucket array.

13. A computer-readable storage medium storing instructions that when executed by a computer cause the computer to perform a method for using a hash table that is fully dynamic and lock-free, wherein the computer-readable storage medium does not include computer instruction signals embodied in a transmission medium, and wherein the method comprising:
performing a lookup into the hash table, wherein the lookup involves,
using a hash key to lookup a bucket pointer in a bucket array,
following the bucket pointer to a data node within a linked list containing all of the data nodes in the hash table, and
searching from the data node through the linked list to locate a node that matches the hash key if one exists;
wherein the linked list contains only data nodes and at most a constant number of dummy nodes; and
when the average number of data nodes in each bucket exceeds a maximum value:
increasing the number of buckets in the bucket array to form a larger bucket array, and
using more bits from the hash key to perform lookups in the larger bucket array,
wherein the data nodes are stored in the linked list in bit-inverted hash key order, and
wherein increasing the number of buckets in the bucket array involves copying the existing bucket array into the top half of the larger bucket array through a single pointer operation.

14. The computer-readable storage medium of claim 13, wherein the data node pointed to by the bucket pointer precedes the nodes in the bucket.

15. The computer-readable storage medium of claim 14, wherein deleting the data node from the linked list involves using garbage collection or a solution to the repeat offender problem to reclaim the data node if possible.

16. The computer-readable storage medium of claim 13, wherein deleting the data node from the linked list involves:
using an atomic operation to mark the data node as dead; and
atomically updating the next pointer of the predecessor of the data node to point around the data node to the successor of the data node in the linked list.

17. The computer-readable storage medium of claim 16, wherein deleting the data node from the linked list additionally involves redirecting the next pointer of the data node to become a back pointer that points to the predecessor of the data node.

18. The computer-readable storage medium of claim 17, wherein if a search through a chain of nodes from the back pointer does not lead to a live node, the method further comprises:
obtaining a parent bucket pointer;
searching through the linked list from a node pointed to by the parent bucket pointer to locate a starting node for the bucket pointer; and
updating the bucket pointer to point to the starting node.

19. The computer-readable storage medium of claim 13, wherein the method further comprises generating the hash key by performing a pre-hashing operation to achieve a uniform distribution of hash keys over possible hash key values.

20. The computer-readable storage medium of claim 13, wherein buckets in the larger bucket array are initialized on-the-fly as they are referenced.

21. The computer-readable storage medium of claim 13, wherein initializing a bucket pointer involves:
obtaining a parent bucket pointer for the bucket pointer;
searching through the linked list from a node pointed to by the parent bucket pointer to locate a starting node for the bucket pointer; and
updating the bucket pointer to point to the starting node.

22. The computer-readable storage medium of claim 13, wherein if there exists an old hash table, initializing a bucket pointer involves looking for a corresponding entry in the old hash table first, and if this fails:
obtaining a parent bucket pointer for the bucket pointer;
searching through the linked list from a node pointed to by the parent bucket pointer to locate a starting node for the bucket pointer; and
updating the bucket pointer to point to the starting node.

23. The computer-readable storage medium of claim 13,
wherein the data nodes are stored in the linked list in hash key order; and
wherein increasing the number of buckets in the bucket array involves interleaving the bucket array into the larger bucket array.

24. The computer-readable storage medium of claim 13, wherein if the average number of data nodes in each bucket falls below a minimum value, the method further comprises:
reducing the number of buckets in the bucket array to form a smaller bucket array; and
using less bits from the hash key to perform lookups in the smaller bucket array.

25. An apparatus that implements a hash table that is fully dynamic and lock-free, comprising:
a lookup mechanism, wherein the lookup mechanism is configured to,
use a hash key to lookup a bucket pointer in a bucket array,
follow the bucket pointer to a data node within a linked list containing all of the data nodes in the hash table, and
search from the data node through the linked list to locate a node that matches the hash key if one exists;
wherein the linked list contains only data nodes and at most a constant number of dummy nodes; and a bucket array expansion mechanism, wherein when the average number of data nodes in each bucket exceeds a maximum value, the bucket array expansion mechanism is configured to:
- increase the number of buckets in the bucket array to form a larger bucket array, and to
- use additional bits from the hash key to perform lookups in the larger bucket array,
- wherein the data nodes are stored in the linked list in bit-inverted hash key order, and
- wherein the bucket array expansion mechanism is configured to copy the existing bucket array into the top half of the larger bucket array through a single pointer operation.

26. The apparatus of claim 25, wherein the data node pointed to by the bucket pointer precedes the nodes in the bucket.

27. The apparatus of claim 26, wherein the node deletion mechanism is additionally configured to use garbage collection or a solution to the repeat offender problem to reclaim the data node if possible.

28. The apparatus of claim 26, further comprising a bucket array contraction mechanism, wherein if the average number of data nodes in each bucket falls below a minimum value, the bucket array contraction mechanism is configured to:
- reduce the number of buckets in the bucket array to form a smaller bucket array; and to
- use less bits from the hash key to perform lookups in the smaller bucket array.

29. The apparatus of claim 25, further comprising a node deletion mechanism configured to:
- use an atomic operation to mark the data node as dead; and to
- atomically update the next pointer of the predecessor of the data node to point around the data node to the successor of the data node in the linked list.

30. The apparatus of claim 29, wherein the node deletion mechanism is additionally configured to redirect the next pointer of the data node to become a back pointer that points to the predecessor of the data node.

31. The apparatus of claim 30, further comprising a bucket pointer updating mechanism, wherein if a search through a chain of nodes from the back pointer does not lead to a live node, the bucket pointer updating mechanism is configured to:
- obtain a parent bucket pointer;
- search through the linked list from a node pointed to by the parent bucket pointer to locate a starting node for the bucket pointer; and to
- update the bucket pointer to point to the starting node.

32. The apparatus of claim 25, further comprising a pre-hashing mechanism configured to generate the hash key by performing a pre-hashing operation to achieve a uniform distribution of hash keys over possible hash key values.

33. The apparatus of claim 25, further comprising a bucket initialization mechanism configured to initialize buckets in the larger bucket array on-the-fly as they are referenced.

34. The apparatus of claim 25, wherein the bucket initialization mechanism is configured to:
- obtain a parent bucket pointer for the bucket pointer;
- search through the linked list from a node pointed to by the parent bucket pointer to locate a starting node for the bucket pointer; and to
- update the bucket pointer to point to the starting node.

35. The apparatus of claim 25, wherein if there exists an old hash table, the bucket initialization mechanism is configured to look for a corresponding entry in the old hash table first, and if this fails to:
- obtain a parent bucket pointer for the bucket pointer;
- search through the linked list from a node pointed to by the parent bucket pointer to locate a starting node for the bucket pointer; and to
- update the bucket pointer to point to the starting node.

36. The apparatus of claim 25,
- wherein the data nodes are stored in the linked list in hash key order; and
- wherein the bucket array expansion mechanism is configured to interleave the bucket array into the larger bucket array.

* * * * *

UNITED STATES PATENT AND TRADEMARK OFFICE
CERTIFICATE OF CORRECTION

PATENT NO. : 7,287,131 B1 Page 1 of 1
APPLICATION NO. : 10/674942
DATED : October 23, 2007
INVENTOR(S) : Paul A. Martin et al.

It is certified that error appears in the above-identified patent and that said Letters Patent is hereby corrected as shown below:

In claim 1 (at column 12, line 19), please delete the word "when" and replace with the word --if--, so that the phrase reads --if the average number of data nodes ...--.

In claim 13 (at column 13, line 44), please delete the word "when" and replace with the word --if--, so that the phrase reads --if the average number of data nodes ...--.

Signed and Sealed this

Eighteenth Day of December, 2007

JON W. DUDAS
*Director of the United States Patent and Trademark Office*